Figure 1:
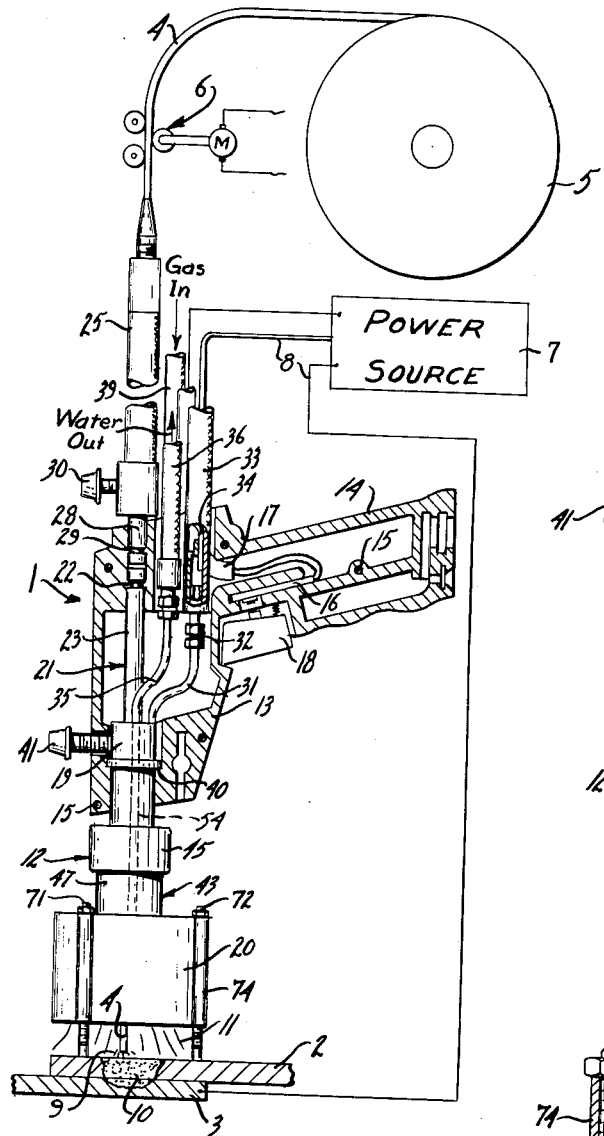

Aug. 10, 1965  W. A. FAUST  3,200,235
HEAVY DUTY SPOT WELDING APPARATUS AND METHOD
Filed June 19, 1963

INVENTOR.
WILLIAM A. FAUST
BY
Andrus & Starke
Attorneys

United States Patent Office 3,200,235
Patented Aug. 10, 1965

3,200,235
HEAVY DUTY SPOT WELDING APPARATUS
AND METHOD
William A. Faust, Delavan, Wis., assignor to A. O. Smith
Corporation, Milwaukee, Wis., a corporation of New York
Filed June 19, 1963, Ser. No. 289,055
5 Claims. (Cl. 219—127)

This invention relates to heavy duty spot welding apparatus and method and particularly to a welding nozzle construction for permitting burn-through spot welding of relatively heavy guage metal members.

In arc spot welding, a weld is made by melting or fusing of the materials to be joined under the influence of an electric arc. Gas-shielded arc spot welding processes are advantageously employed in that they allow disposition of the welding apparatus to only one side of the work with the arc being struck between an electrode and the upper face of the work. In accordance with known operations, the arc extends and fuses the metal through the upper member into the lower member to effect the bonding together of the members. A consumable electrode spot welding has more recently been employed because of certain advantages such as elimination of craters and production of greater weld strength. In such devices, the welding apparatus terminates in an arc enclosing nozzle which engages the work about the area to be spot welded and confines the shielding gas to envelop the arc. Small discharge openings are provided in the lower edge of the nozzle to prevent gas presure buildup about the arc.

However, the ability to spot weld overlapping plates in gas shielded consumable electrode processes has been generally limited to relatively thin plates of the order of ⅛ inch or less where high strength, crack-free weld joints are required. When the thickness of the plates has been increased beyond this magnitude, consistently high quality welds could not be generally obtained.

Applicant has discovered that the apparent cause of the defective welds with heavier plate results from the building up of heat within the weld zone as the result of the necessary high currents required to cause a fusion or burn-through of the upper plate member. Further, applicant has realized that by a proper increase in gas flow, the heat buildup in the weld can be restricted to a suitably low level and thereby permit welding of relatively heavy gauge plate and the like. In accordance with this realization of the problem and solution, applicant provides an improved gas shielded consumable electrode welding process and particularly provides an improved arc welding nozzle. The arc welding nozzle is spaced from the work which provides for an increased flow of gas about the spot weld during and immediately following the formation of the spot weld to effect a rapid cooling thereof and prevent formation of cracks and the like. Applicant has found that with his invention, consistently excellent welds can be made in ⅝ inch thick carbon steel overlapping plates although this is not considered to be the limits of use of the invention.

In accordance with a preferred construction of the present invention, the welding nozzle unit is connected to an insulating housing with a water jacket nozzle or barrel projecting forwardly therefrom and terminating in a bell-shaped nozzle. Water cooling extends down through the barrel and about the bell-shaped nozzle to carry away the heat generated in the area surrounding the arc and transmitted to the nozzle assembly. Adjustable positioning screws are provided with the gun and adjustably project outwardly from the end of the nozzle for precise and accurate positioning of the lower end of the nozzle with respect to the work.

Applicant has determined that the exclusion of air alone as by the provision of a gas envelope over the arc is insufficient to insure high quality welds when welding heavy gauge plates. There must be a relationship between the heat generated and the gas flow during the welding process and immediately following the welding process if sound weld metal is to be produced joining the overlapping members. The size of the electrode, the water cooling, the particular gas employed, will also provide significant variations. The relationship of such variables in connection with the carrying out of the heavy duty arc welding process is more fully disclosed in a manner in the following description to clearly be understood by those skilled in the art by reference to the accompanying drawings.

The present invention thus provides a means and improved apparatus for welding of overlapping heavy gauge plate. The apparatus of the present invention is relatively simple and can be constructed for incorporation in known gas shielded arc welding guns by suitable arrangement of the gas, water and current connections as well as the incoming electrode connection.

The drawing furnished herewith illustrates the best mode presently contemplated for carrying out the invention.

Figure 2:
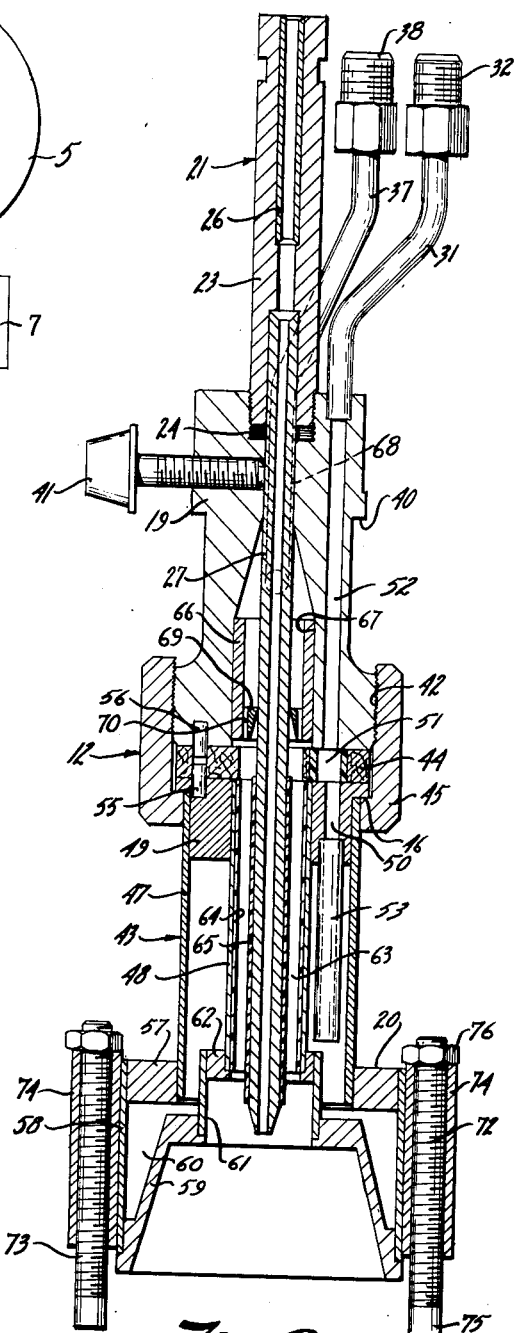

In the drawing:

FIG. 1 is a side elevational view partly in section and partly in elevation of a hand welding gun in position for spot welding a pair of overlapping metal members; and FIG. 2 is an enlarged vertical section through the welding nozzle assembly shown in FIG. 1.

Referring particularly to FIG 1, a gas shielded consumable electrode arc spot welding assembly is shown including a hand gun unit 1 which is adapted to be manually held with the discharge end of the gun engaging the upper one of a pair of heavy gauge overlapped metal plates 2 and 3. A consumable electrode 4 is carried by a supply reel or spool 5 suitably located with respect to the gun 1, and is adapted to be withdrawn by any suitable drive means shown as power driven roller means 6 and fed through the gun unit 1 to the overlapping plates 2 and 3. An arc welding power source 7 such as the usual transformer-rectifier combination is provided and connected by a pair of power leads 8 to the electrode 4 through the gun unit 1 and to the lower metal plate 3. When power source 7 is turned on and the electrode 4 driven through the gun 1, and arc 9 is established between the tip of the electrode 4 and the upper or inner metal plate 2. A suitable timer, not shown, can be provided as a part of the power source for feeding the electrode 4 for a predetermined time after which the electrode feed is stopped and the arc 9 automatically burns back and breaks the arc to form single spot weld 10. During establishment of the arc 9 and for a short period after termination thereof, an envelope or cover of a suitable shielding gas 11 encloses the arc 9 to prevent contamination of the weld metal by the constituents of the surrounding atmosphere. In accordance with the present invention however the gas shielding is increased in magnitude to provide a cooling function and is maintained after breaking of the arc 9 for a predetermined period to prevent formation of cracks in the spot weld.

The present invention is directed to the construction of the gun 1 and more particularly a nozzle unit 12 which projects from an insulating housing or body 13 having a pistol type handle or grip 14. The illustrated body 13 is generally a hollow housing which is split longitudinally into a pair of complementing halves and interconnected by suitable securement nut and bolt units 15 or the like, similar to that shown in the Piekarski Patent 2,903,567. The illustrated nozzle unit 12 forming part of the present invention is secured within the body 13 as hereinafter described and is preferably such as to be interchangeable with a nozzle assembly for other forms of consumable electrode welding generally as shown in the Piekarski patent. A welding package can then be manufactured and sold comprising a standard body portion having interchangeable nozzle assemblies for use in accordance with the particular type of welding to be done.

Referring again particularly to FIG. 1, an on-off switch 16 is provided in the handle or grip 14 and connected by a trigger lead cable 17 which extends outwardly through a suitable opening in the back wall of body 13 into the circuit of power source 7 and power leads 8. A trigger 18 is provided for actuating switch 14 to selectively complete the connection of the arc welding source 7 to the power leads 8 and thereby impress power between the electrode 4 and the plates 2 and 3 for establishing the arc 9. The power transfer to electrode 4 is made through a portion of the nozzle unit 12.

The nozzle unit 12 generally includes a terminal block 19 which is secured within a relatively heavy forward wall 16 in body 13, extends forwardly from the body and terminates in gas shielding nozzle 20. An electrode guide assembly 21 is secured to the inner end of the terminal block 19 to form a part thereof and projects rearwardly through the hollow portion of body 13 and terminates in a rear shoulder or wall portion of the body 13. The rearward end of assembly 21 is grooved to mate with a ring projection 22 within the back wall of body 13 whereby the nozzle unit 12 is rigidly clamped within the front and rear walls of body 13 when the split halves are joined by nut and bolt units 15.

Referring to FIG. 2, the illustrated wire guide assembly 21 includes a tubular guide 23 which is threaded into a correspondingly tapped recess 24 in the back face or wall of the terminal block 19. The guide 23 projects rearwardly into the clamping recess in the rear portion of the gun body 13 for connection to a cable assembly 25 which supports the electrode 4 between the supply reel 5 and gun unit 1. A metallic wear tube 26 is provided in the back or rear portion of the tubular guide 23. The forward end of the guide 23 is recessed to accommodate the innermost end of a contact tube 27 which extends therefrom through block 17. Assembly 18 thus guides the electrode 4 from cable assembly 25 to the contact tube 27. An adapter 28 shown in FIG. 1 is secured within the back wall of gun body 13 as at 29 and projected outwardly into a releasable connection with the incoming electrode cable assembly 25. The adapter 28 is a tubular member having a clamping screw or bolt 30 exteriorly of the gun body 13. The end of electrode cable assembly 25 projects into the adapter 28 and is clamped therein by tightening of the clamping bolt 30.

The electrode 4, in summary, is withdrawn from the supply spool 5 and passes through the electrode cable assembly 25 and the adapter 28 into the gun unit 1. Within the gun unit 1, the electrode 4 passes through the tubular guide assembly 23 and the contact tube 27 to the overlapping plates 2 and 3. Current is supplied from the power source 7 to electrode 4 to establish and maintain the arc 9 and a proper flow of shielding gas 11 is provided through the nozzle unit 12, as follows.

A water inlet and power cable tube 31 is connected to the terminal block 19 and projects rearwardly and to one side, terminating in a line coupling 32 within the body 13. An incoming water and power line 33 extends through the back wall opening and is releasably connected to coupling 32. The electrode power lead 8 is secured within the line 33 by a suitable clip 34 which also forms the line part of coupling 32. Water and power is thus transmitted to terminal block 19, with the power being transferred to the electrode 4 and the water being circulated through nozzle assembly 12 to cool the nozzle 20. A water discharge tube 35 is similarly secured to the terminal block 19 and to an incoming water line 36.

A gas tube 37 is also secured to the terminal block 19 and projects rearwardly and to one side thereof, terminating in a releasable coupling 38 within body 12, as shown in FIG. 2. An incoming gas line 39 projects inwardly through the rear wall of the body 12 immediately adjacent the electrode cable connection. The gas is fed to terminal block 17 and then through the nozzle unit 12 as subsequently described.

Referring particularly to FIG. 2, the inner end of terminal block 19 is enlarged slightly and defines a clamping shoulder 40 engaging the flanged forward wall of the gun body 13. The terminal block 19 is formed of any other suitable conducting material and includes a central passageway within which the contact tube 27 is releasably clamped. The contact tube 27 is supported within the terminal block 19 by a clamping bolt 41 which passes through a suitable opening in the forward portion of the gun body 13 and threads through a corresponding tapped opening in the terminal block 19 into bearing engagement with the adjacent portion of the contact tube. The position of the contact tube 27 can be readily adjusted or the contact tube can be readily replaced when required by loosening of the bolt 41 and removing thereof through the nozzle 20.

The terminal block 19 projects forwardly through the opening in the front wall of the insulating body 13 and terminates in an exteriorly threaded portion 42 spaced slightly forwardly of the body 13. A water cooled barrel 43 is secured to the outer end of the terminal block 19 with an insulating gasket 44 disposed therebetween. A clamp nut 45 is slidably disposed over the cooling barrel 43 for selective threading onto block 19. The clamp nut 45 engages a flange or shoulder 46 on the adjacent inner end of the barrel 43 such that when the nut is threaded onto the threaded portion 42 of block 19, the gasket 44 and barrel 43 are drawn into rigid, fixed position with respect to block 19.

The illustrated cooling barrel 43 includes an outer tubular wall 47 and a concentric inner tubular wall 48 interconnected at the opposite ends by a rear header 49 and the nozzle 20. A water inlet passageway 50 is provided in the rear header 49 in alignment with aligned water passageways 51 and 52 extending backwardly through gasket 44 and block 19 and terminating in the water inlet tube 31. An extension tube 53 is secured within the inlet passageway 50 and extends forwardly, terminating adjacent the nozzle 20. A water discharge passageway 54, shown in FIG. 1, is also provided extending through the rear header 49, gasket 44 and block 19 and is connected to the water outlet conduit or tube 35. Passageway 54 is circumferentially spaced ninety degrees from the inlet passageway 51 to avoid interference therebetween and provide space for the connecting tubes. Suitable alignment pins 55 and 56 fit within the aligning openings in gasket 44 and the adjacent ends of terminal block 19 and header 49 to align the several water passageways. During the establishment of arc 9, water flows inwardly through extension tube 53 in the barrel 43 to the forward end thereof and into the nozzle 20 before flowing backwardly through barrel 43 and discharging outwardly through the outlet passageway 54 to prevent overheating of the nozzle 20, which is connected to barrel 43, as follows.

A front header 57 includes an opening corresponding to the outer diameter of the outer wall 47 of barrel 43. The forward end of wall 47 is secured within the opening in any suitable manner such as by brazing or welding. A nozzle shell 58 is welded to the exterior periphery of the header 57 and projects forwardly therefrom. A bell-shaped or frusto conical inner cup 59 is secured within the shell 58 with the base portion of the cup 59 spaced forwardly from the header 57 to define a cooling chamber 60. The base portion is centrally apertured and a spacer tube 61 is welded to the edge thereof and projects rearwardly into the barrel 43 generally intermediate the concentric outer and inner walls 47 and 48 thereof. A small spacer ring 62 is sealed to the inner end of the tube 61 and the adjacent end of the inner wall 48 to provide a liquid tight seal between the inner wall and the adjacent end of the nozzle. The cooling passageway or chamber defined by the barrel walls 47 and 48 is in communication with the nozzle cooling chamber 60 via the passageway between the spacer tube 61 and outer wall 47. The cooling water thus flows downwardly from the barrel 43 about the nozzle 20 to prevent damaging heating thereof.

In order to maintain proper operation and gas flow, the inner surface of the nozzle cup 59 is preferably nickel plated or the like to provide a spatter resistant surface. In spot welding and the like, forces within the arc are such that small pieces of weld metal are blown from the arc area. The spatter will fuse to an adjacent metal surface in the absence of some means of preventing the fusion therebetween. A nickel plated nozzle in combination with the water cooling provides a highly satisfactory means for preventing spatter from sticking to the nozzle.

The inner tubular wall 48 of barrel 43 is radially spaced from the contact tube 27 and defines an encircling gas passageway 63 about the contact tube within the barrel 43. Within the barrel 43, an insulating sleeve 64 covers the inner surface of the wall 48 and an insulating sleeve 65 fits over and covers the contact tube 27. The insulating sleeves 64 and 65 positively prevent flashover between the contact tube 27 and the wall 48 of the barrel 43 and thus prevent puncturing of the cooling passageway, as a result of flashover across the gas shielding passageway 63.

The gas flow should be in the laminar range as it passes through the nozzle 20 into protective covering of arc 9 for optimum welding conditions. In the illustrated embodiment of the invention, laminar flow of the shielding gas is created by a diffuser 66 which is mounted within the terminal block 19. A gas passageway 67 encircling contact tube 27 is formed within the terminal block 19 forwardly of the clamping of the contact tube 27 by the clamping bolt 30 and includes an inner conical base portion communicating with a single gas port 68 extending rearwardly through the terminal block 19 and terminating in connection to the incoming gas tube. The diffuser 66 includes a ring-like closure disposed within the forward portion of the gas passageway in the terminal block 19. A plurality of small circumferentially spaced axial passageways 70 is provided in the the closure such that the incoming gas is transferred into the gas passageway 63 of the barrel 43 through a plurality of relatively small openings immediately adjacent the inner wall of the barrel 43.

The positioning of the end of the nozzle 20 with respect to the adjacent plates 2 and 3 is very important in the present invention. Thus, in contrast to spot welding systems wherein the nozzle is held in tight engagement with the work with only small openings provided to release the gas, the present invention positively spaces the end of the nozzle 20 from the plates 2 and 3 to allow the relatively free discharge of the shielding gas from the nozzle. The flow of gas is sufficiently high to maintain a complete protective envelope about the arc 9 while creating a substantial cooling effect.

In accordance with the present invention, the necessary gas flow is permitted by proper spacing of the contact tube 27 and the nozzle 20 from the plate 2, as follows. Three circumferentially distributed adjusting screws 71, 72 and 73 are similarly adjustably supported to the outer periphery of the nozzle shell 58. The mounting of adjusting screw 72 will be particularly described.

A tubular support 74 is welded or otherwise secured to the outer shell 59 with the axis extending parallel to that of the contact tube 27 and the nozzle 20. The tubular support is internally threaded to receive the adjusting screw 72 which extends completely therethrough and is adapted to project forwardly of the welding nozzle. The forward end of the adjusting screw 72 is provided with a hex head 75 for threading of the adjusting screw 72 through the tubular support 74 with any suitable tool, not shown, and for establishing a minimum positioning of the nozzle 20 with respect to the plate 2. A lock nut 76 is threaded onto the back end of the adjusting screw 72 to hold the screw 72 in the adjusted position. With this structure, the gas envelope or cover 11 is maintained with a relatively high rate of gas flow which also serves to rapidly and effectively cool the weld 10. This structure provides a very efficient and satisfactory means for establishing a suitable gas shielding apparatus for welding of heavy duty plate.

In operation, the nozzle unit 12 is assembled with the gun body 13 and the adjusting screws 71 through 73 are properly located within the corresponding tubular supports 74 to locate the tip of the nozzle 20 a predetermined distance from the plate 2. The gun unit 1 is held in position with the outer end of the adjusting screws resting directly on the plate 2 and the trigger 18 is actuated to connect the power source 7 to the electrode 4 and plate 3 and simultaneously establishes shielding gas flow and water flow. In certain applications, it may be desirable to establish gas flow shortly before current flow in order to purge the weld area of air and the like prior to establishment of the arc 9. In this manner, a gas shield welding arc 9 is established and maintained for a predetermined time. As previously noted, electrode 4 may be allowed to burn back and automatically break the arc 9 to complete the welding cycle.

In accordance with the present invention, the welding gas is caused to flow through the unit, preferably in a laminar flow, and at a relatively high rate to establish a high rate of cooling as well as shielding in the weld region. The high cooling rate, applicant has found, is of particular importance in the welding of heavy duty plate where approximately double the welding current is necessary.

The present invention has been employed to arc spot weld up to 5/8 inch carbon steel plate. Thicker plates can be welded by this method. A 5/32 inch diameter consumable electrode was used with a welding current of 900 amps at 50 volts supplied from a constant potential direct current power source. A nozzle having a lower opening of 2½ inches and otherwise corresponding to nozzle 20 was employed with the adjustment screws spacing the tip of the nozzle inches from the plate. A carbon dioxide shielding gas was fed to the arc.

The present invention thus provides a simple method and means for consumable electrode arc spot welding of heavy plate. The nozzle assembly of the present invention may be constructed to be interchangeable with other nozzle assemblies for other welding purposes and thus reduce the expense and total equipment necessary to do a wide variety of arc welding.

Various modes of carrying out the invention are contemplated as being within the scope of the following claims particularly pointing out and distinctly claiming the subject matter which is regarded as the invention.

I claim:

1. In heavy duty spot welding apparatus adapted to establish a burn-through spot weld in a pair of overlapped heavy gauge plates, comprising,
   (a) means to support an electrode in alignment with the position to be spot welded for a selected time period,
   (b) means establishing a shielding gas passageway about said electrode for directing a shielding gas concentrically and axially about the electrode, and (c) a nozzle encircling the arc tip portion of the electrode and being spaced from the work a predetermined distance to allow relatively unimpeded gas flow from the arc, said gas flow being selected to prevent damaging concentration of heat within the spot weld region.

2. The structure of claim 1 wherein said nozzle comprises, (a) a frusto-conical gas directing cup, (b) a water cooling chamber encircling said cup, and (c) adjustable means secured to the cup for adjustably positioning the bottom of the cup from the plate being welded and thereby controlling the back pressure of the shielding gas in the arc area.

3. A manual welding gun for consumable-electrode gas-shielded spot welding of a pair of overlapping heavy gauge plates, which comprises, (a) a molded casing of lightweight and electrical insulating material and having a body portion and a laterally depending handle portion adjacent the back wall of the casing, said body portion having a thick forward wall with a longitudinal opening partially closed by a ring flange and having a centrally apertured embossment in the rear wall of the casing in alignment with said opening and forming a generally hollow chamber between the front and back wall, (b) a water-cooled welding nozzle disposed within said forward opening and extending forwardly therethrough and having a longitudinal contact tube, said welding nozzle including, (1) a terminal block within the body portion and projecting forwardly therefrom and terminating in an exteriorly threaded portion, said terminal block having a central contact tube passageway and water circulating passageways and a shielding gas passageway for directing shielding gas about the contact tube, (2) a water cooling barrel releasably secured to the outer end of the terminal block, (3) an insulating gasket clamped between the water cooling barrel and the terminal block, (4) a gas-directing nozzle secured to the forward end of the barrel and having an encircling cooling chamber communicating with the barrel cooling chamber, and (5) adjustable means for supporting the nozzle spaced from the plate a predetermined distance to allow a substantial flow of shielding gas in excess of that necessary to exclude the surrounding environment from the arc.

4. A consumable-electrode gas shielded spot welding nozzle adapted to be releasably secured to a supporting structure, comprising, (a) a terminal block having a mounting end adapted to be secured within the supporting structure and a projecting portion terminating in an exteriorly threaded portion, said terminal block having a central contact tube passageway and water circulating passageways and a shielding gas passageway for directing shielding gas about the contact tube, (b) a water cooling barrel releasably secured to the outer end of the terminal block, (c) an insulating gasket clamped between the water cooling barrel and the terminal block, (d) a gas-directing nozzle secured to the forward end of the barrel and having an encircling cooling chamber communicating with the barrel cooling chamber, and (e) adjustable means for supporting the nozzle spaced from the plate a predetermined distance to allow a substantial flow of shielding gas in excess of that necessary to exclude the surrounding environment from the arc.

5. In the process of burn-through spot welding of heavy gauge plate-like members having a thickness substantially in excess of ⅛ inch by a gas shielded arc, (a) establishing an arc between a consumable electrode and a weld spot on the member for a selected time, and (b) feeding a shielding gas to the arc to envelop said arc in a gas blanket, the rate of said gas flow being related to the arc current to establish predetermined cooling of the work as well as shielding of the arc and thereby creating a sound and crack-free burn-through spot weld of the members.

References Cited by the Examiner

UNITED STATES PATENTS

| | | | |
|---|---|---|---|
| 1,746,207 | 2/30 | Alexander | 219—74 |
| 2,583,665 | 1/52 | Pilia | 219—127 |
| 2,965,745 | 12/60 | Hardy et al. | 219—127 |

RICHARD M. WOOD, *Primary Examiner*